United States Patent
Tanaka et al.

(10) Patent No.: US 11,236,657 B2
(45) Date of Patent: Feb. 1, 2022

(54) MANUFACTURING METHOD FOR EXHAUST GAS PURIFICATION DEVICE

(71) Applicant: CATALER CORPORATION, Kakegawa (JP)

(72) Inventors: Yuki Tanaka, Kakegawa (JP); Shoko Fukuyo, Kakegawa (JP); Kazuma Nakada, Kakegawa (JP); Eiichi Yasutomi, Kakegawa (JP); Ryo Nishimura, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 231 days.

(21) Appl. No.: 16/497,320

(22) PCT Filed: Feb. 23, 2018

(86) PCT No.: PCT/JP2018/006814
§ 371 (c)(1),
(2) Date: Sep. 24, 2019

(87) PCT Pub. No.: WO2018/180090
PCT Pub. Date: Oct. 4, 2018

(65) Prior Publication Data
US 2021/0115828 A1    Apr. 22, 2021

(30) Foreign Application Priority Data

Mar. 31, 2017 (JP) .............................. JP2017-072988

(51) Int. Cl.
*B05D 1/02* (2006.01)
*B05D 3/02* (2006.01)
(Continued)

(52) U.S. Cl.
CPC ............... *F01N 3/28* (2013.01); *B01D 53/94* (2013.01); *B01J 35/04* (2013.01); *B01J 37/0215* (2013.01);
(Continued)

(58) Field of Classification Search
None
See application file for complete search history.

(56) References Cited

U.S. PATENT DOCUMENTS

2016/0067720 A1* 3/2016 Nakano ................ B01J 35/04
                                                    118/696

FOREIGN PATENT DOCUMENTS

JP    2006-015205 A    1/2006
WO    2010/114132 A1   10/2010

* cited by examiner

*Primary Examiner* — Alexander M Weddle
(74) *Attorney, Agent, or Firm* — Oliff PLC (57) ABSTRACT

The purpose of the present invention is to provide a manufacturing method for an exhaust gas purification device that can uniformly coat a honeycomb substrate with slurry even when using a low viscosity slurry. The present invention pertains to a manufacturing method for an exhaust gas purification device that includes providing a slurry for catalyst layer formation from a shower nozzle onto a honeycomb substrate, coating the honeycomb substrate with the slurry, and firing the honeycomb substrate coated with the slurry, wherein the viscosity of the slurry at a shear rate of $4\ s^{-1}$ is 800 mPA·s or less, the shower nozzle has a plurality of discharge openings for discharging the slurry, the relationship of the spacing a) of the discharge openings and the diameter b) of the liquid drops formed when starting supply of the slurry is 0.85<a/b, and the equivalent diameter c) of a slurry face when starting supply of the slurry and the slurry has spread on the honeycomb substrate is greater than or equal to the spacing a) of the discharge openings.

13 Claims, 8 Drawing Sheets

(a)

(b)

(51) Int. Cl.
  *B01J 37/02* (2006.01)
  *F01N 3/28* (2006.01)
  *B01D 53/94* (2006.01)
  *B01J 35/04* (2006.01)
  *F01N 3/022* (2006.01)
  *F01N 3/035* (2006.01)
(52) U.S. Cl.
  CPC ................. *B05D 1/02* (2013.01); *B05D 3/02* (2013.01); *F01N 3/0222* (2013.01); *F01N 3/035* (2013.01)

MANUFACTURING METHOD FOR EXHAUST GAS PURIFICATION DEVICE

FIELD

The present invention relates to a manufacturing method for an exhaust gas purification device. In particular, the present invention relates to a manufacturing method for an exhaust gas purification device, which enables a uniform coating when coating a honeycomb substrate with a slurry for catalyst layer formation, even if the slurry used has a low viscosity.

BACKGROUND

The exhaust gas purification device includes, for example, a honeycomb substrate including a plurality of through holes, and a catalyst layer formed on the honeycomb substrate. Such an exhaust gas purification device is produced, for example, by applying a slurry for catalyst layer formation onto a honeycomb substrate, and then drying and firing the honeycomb substrate.

For example, Patent Document 1 discloses a device for applying such a slurry to a honeycomb substrate. In Patent Document 1, after supplying the slurry to the slurry storage portion located at an upper portion of the honeycomb substrate, the liquid level of the slurry accumulated in the slurry storage portion is equalized by the equalization mechanism. Thereafter, the slurry accumulated in the slurry storage portion is sucked from a lower portion side of the honeycomb substrate, thereby uniformly coating the slurry on the honeycomb substrate.

Patent Document 2 discloses a nozzle for supplying a slurry to an upper portion of a honeycomb substrate. Patent Document 2 discloses a nozzle capable of steadily discharging the slurry also from the discharge openings at the end face portion of the nozzle. By using such a nozzle, it is possible to prevent the discharged slurry from being deposited only on the central portion of the upper portion of the honeycomb substrate, and thereby the slurry can be uniformly coated on the honeycomb substrate.

Figure 6:
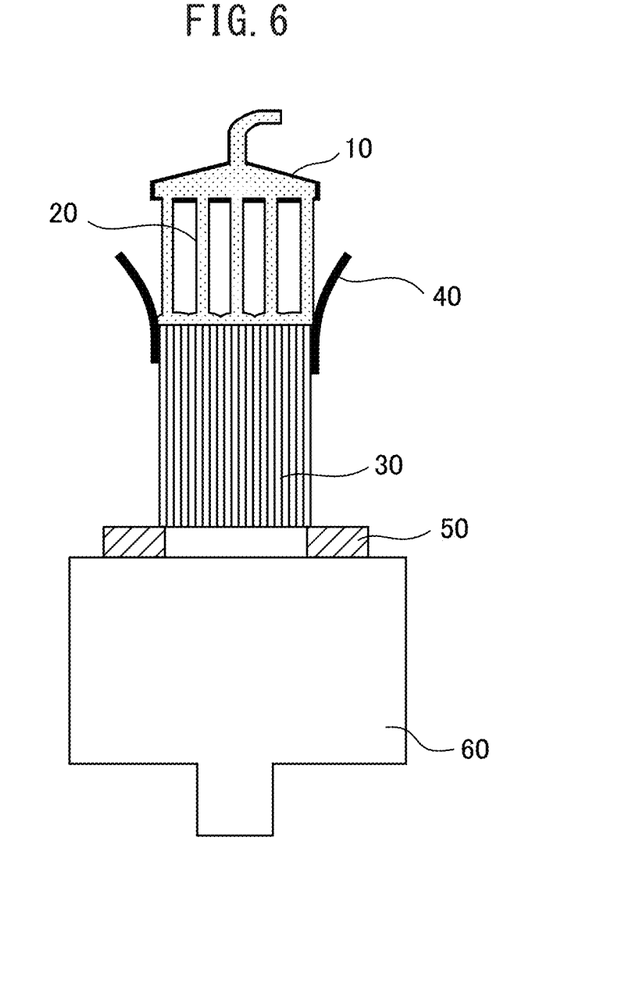
FIG. 6 shows a schematic view of a device for coating a honeycomb substrate with a slurry.

As shown in FIG. 6, in Patent Document 2, a high viscosity slurry (20) is provided from the nozzle (10) to the upper portion of the honeycomb substrate (30). At this time, the height of the liquid surface of the slurry is made uniform by using a guide (40). The honeycomb substrate (30) is placed on a support (50) and a duct (60) is connected to the support (50). The slurry (20) is coated on the honeycomb substrate (30) by sucking the slurry (20) accumulated at the upper portion of the honeycomb substrate (30) with the duct (60).

These documents are incorporated herein by reference.

PRIOR ART LITERATURE

Patent Documents

Patent Document 1: JP2006-15205A
Patent Document 2: WO2010/114132A

SUMMARY

Problems to be Solved by the Invention

In the prior art, the viscosity of the slurry for catalyst layer formation is increased to store the slurry in the upper portion of the honeycomb substrate, and then the slurry is sucked from the lower portion side of the honeycomb substrate to coat the slurry on the honeycomb substrate. In the prior art, in order to uniformly coat the slurry on the honeycomb substrate, it has been a challenge to realize that the slurry is uniformly deposited on the upper portion of the honeycomb substrate.

However, when the viscosity of the slurry is increased, the slurry adheres to the manufacturing device, and there is a problem that the honeycomb substrate cannot be coated with the total amount of the catalyst component. Moreover, in the prior art, due to use of a thickener in order to increase the viscosity of the slurry, there has been a problem that the cost of the slurry becomes high.

Accordingly, an object of the present invention is to provide a manufacturing method for an exhaust gas purification device which can uniformly coat a honeycomb substrate with a slurry, even if the slurry used has a low viscosity.

Means for Solving the Problems

The present inventors have found that the above problems can be solved by the present invention having the following aspects.

<<Aspect 1>>

A manufacturing method for an exhaust gas purification device, the method comprising:

providing a slurry for catalyst layer formation from a shower nozzle onto an upper portion of a honeycomb substrate;

coating the honeycomb substrate with the slurry; and firing the slurry coated honeycomb substrate, wherein the viscosity of the slurry at a shear rate of $4\ s^{-1}$ is 800 mPa·s or less, wherein the shower nozzle has a plurality of discharge openings for discharging the slurry, and a spacing a) between the discharge openings and a diameter b) of the liquid drops formed when starting supply of the slurry, have the following relationship:

$$0.85 < a/b, \text{ and}$$

wherein an equivalent diameter c) of the slurry face when supply of the slurry is started and the slurry spreads onto the honeycomb substrate, is greater than or equal to the spacing a) between the discharge openings.

<<Aspect 2>>

The manufacturing method according to Aspect 1, wherein the viscosity of the slurry at a shear rate of $4\ s^{-1}$ is 10 mPa·s or more and 300 mPa·s or less, and the spacing a) between the discharge openings and the diameter b) of the liquid drops have a relationship of $0.95 < a/b < 1.25$.

<<Aspect 3>>

The manufacturing method according to Aspect 1, wherein the viscosity of the slurry at a shear rate of $4\ s^{-1}$ is more than 300 mPa·s and 800 mPa·s or less, and the spacing a) between the discharge openings and the diameter b) of the liquid drops have a relationship of $0.90 \leq a/b \leq 1.35$.

<<Aspect 4>>

The manufacturing method according to any one of Aspects 1 to 3, wherein a hole diameter of the discharge opening is less than 2 mm.

<<Aspect 5>>

The manufacturing method according to any one of Aspects 1 to 4, wherein the discharge opening of the shower nozzle is present in a convex portion on the surface of the shower nozzle.

<<Aspect 6>>
The manufacturing method according to any one of Aspects 1 to 5, wherein the spacing a) between the discharge openings is 3.25 mm or more and 4.25 mm or less.
<<Aspect 7>>
The manufacturing method according to any one of Aspects 1 to 6, comprising performing suction from a lower portion of the honeycomb substrate when the coating is performed.
<<Aspect 8>>
The manufacturing method according to any one of Aspects 1 to 7, comprising using a guide for preventing the slurry from leaking from the upper portion of the honeycomb substrate when the slurry is provided from the shower nozzle.
<<Aspect 9>>
The manufacturing method according to any one of Aspects 1 to 8, wherein, when the average value of the spacing a) in the central portion of the shower nozzle is set to 1, the average value of the spacing a) in the outer peripheral portion is 0.25 or more and less than 1.0.
<<Aspect 10>>
The manufacturing method according to any one of Aspects 1 to 9, wherein, when the average value of the hole diameter of the discharge openings in the central portion of the shower nozzle is set to 1, the average value of the hole diameter of the discharge openings in the outer peripheral portion is more than 1.0 and 4.0 or less.
<<Aspect 11>>
The manufacturing method according to any one of Aspects 1 to 10, wherein a rectification plate for uniformly providing the slurry over the entire surface of the upper portion of the honeycomb substrate is present inside the shower nozzle.

BRIEF DESCRIPTION OF DRAWINGS

FIG. 7 (a) is a schematic view for explaining waving of a slurry generated when a low viscosity slurry is used. FIG. 7 (b) is a schematic view showing the state of coating in the case of using a high viscosity slurry, in which no waving occurs.

EMBODIMENTS FOR CARRYING OUT THE INVENTION

The method for manufacturing an exhaust gas purification device of the present invention, comprises providing a slurry for catalyst layer formation from a shower nozzle onto an upper portion of a honeycomb substrate, coating the honeycomb substrate with the slurry, and firing the slurry coated honeycomb substrate. Here, the viscosity of the slurry at a shear rate of 4 $s^{-1}$ is 800 mPa·s or less, and the shower nozzle has a plurality of discharge openings for discharging the slurry, and the spacing a) between the discharge openings and the diameter b) of the liquid drops formed when starting supply of the slurry, have the relationship of 0.85<a/b, and the equivalent diameter c) of the slurry face when supply of the slurry is started and the slurry spreads onto the honeycomb substrate, is greater than or equal to the spacing a) between the discharge openings. Here, symbols a), b) and c), as mentioned above, are average values.

The present inventors have found that, when the above-described low viscosity slurry is used in the method for manufacturing an exhaust gas purification device of the prior art, the slurry may flow into the pores of the honeycomb substrate immediately after the slurry is provided. Therefore, it was found that, when the low viscosity slurry as described above is used, the slurry cannot be stored in the upper portion of the honeycomb substrate, and thus an uncoated portion is generated at the position of the upper portion of the honeycomb substrate where the slurry is not provided.

Accordingly, the present inventors repeatedly tried to store a slurry in the upper portion of the honeycomb substrate. However, the lower the viscosity of a slurry, the more difficult it became to reduce an uncoated portion. Therefore, the present inventors conducted investigations to directly and uniformly provide the slurry on the upper portion of the honeycomb substrate so as not to form an uncoated portion on the honeycomb substrate. However, also in this case, it was found that various problems occur. That is, if a large number of discharge openings of the shower nozzle are provided and the diameter of their holes is increased, the area of the slurry provided from the shower nozzle onto the upper portion of the honeycomb substrate is increased. Accordingly, it was believed that the slurry is directly and uniformly provided onto the upper portion of the honeycomb substrate. However, it was turned out that, when the viscosity of the slurry is low, the flows of slurry flowing out from the adjacent discharge openings coagulate to each other and converge (see FIG. 1 (b)), and the slurry cannot be directly and uniformly provided onto the upper portion of the honeycomb substrate.

Then, the present inventors earnestly repeated investigations and have found that the slurry can be directly and uniformly provided onto the upper portion of the honeycomb substrate by specifying the relationship of the spacing a) between the discharge openings of the shower nozzle and the diameter b) of the liquid drops formed when starting supply of the slurry, and at the same time by specifying the relationship of the equivalent diameter of the slurry face when supply of the slurry is started and the slurry spreads onto the honeycomb substrate, and the spacing a).

Furthermore, the present inventors have found that the use of a low viscosity slurry to coat the honeycomb substrate can significantly reduce a pressure loss, especially in the case of a wall flow type honeycomb substrate. It is considered that this is because the use of the low viscosity slurry facilitates the penetration of the slurry into the wall of the porous honeycomb substrate. In addition, it is considered that the catalyst layer is densely packed because the slurry contains no or very little thickener.

Figure 1:
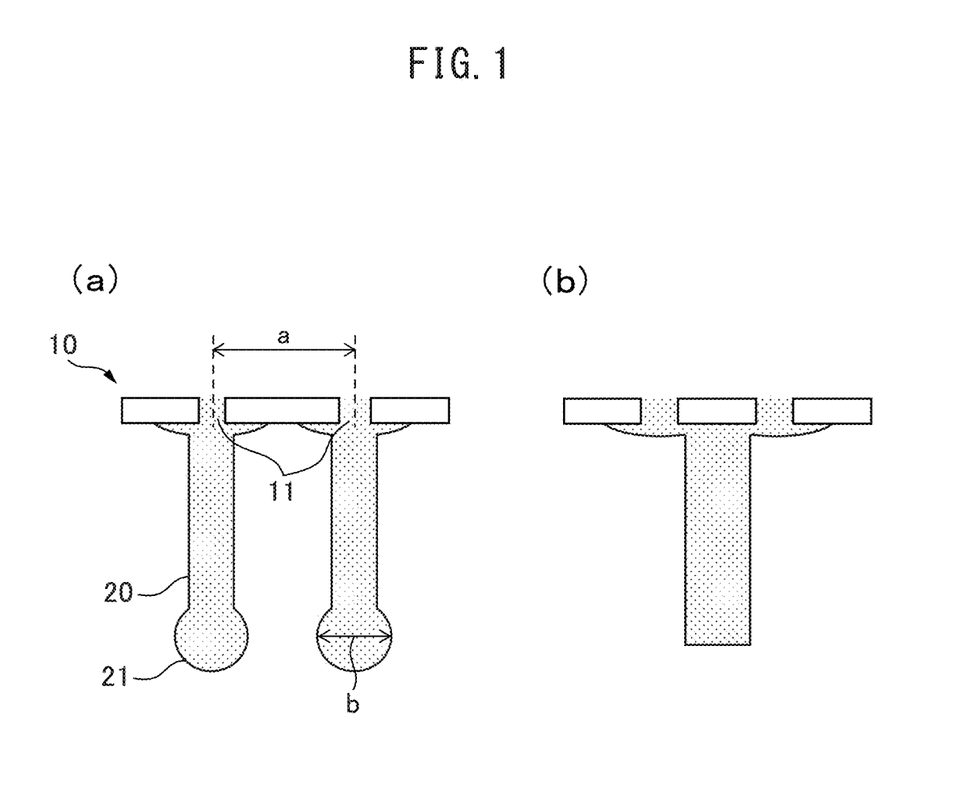
FIG. 1 shows a spacing a) between discharge openings and a diameter b) of liquid drops formed when starting supply of the slurry.

FIG. 1 (a) shows a diagram which explains the spacing a) between the discharge openings (11) of the shower nozzle (10) and the diameter b) of the liquid drops (21) formed when starting supply of the slurry (20). If the spacing a) between the discharge openings (11) is too narrow and/or if the diameter b) of the liquid drops (21) is too large, the slurry will converge as shown in FIG. 1 (b).

Figure 2:
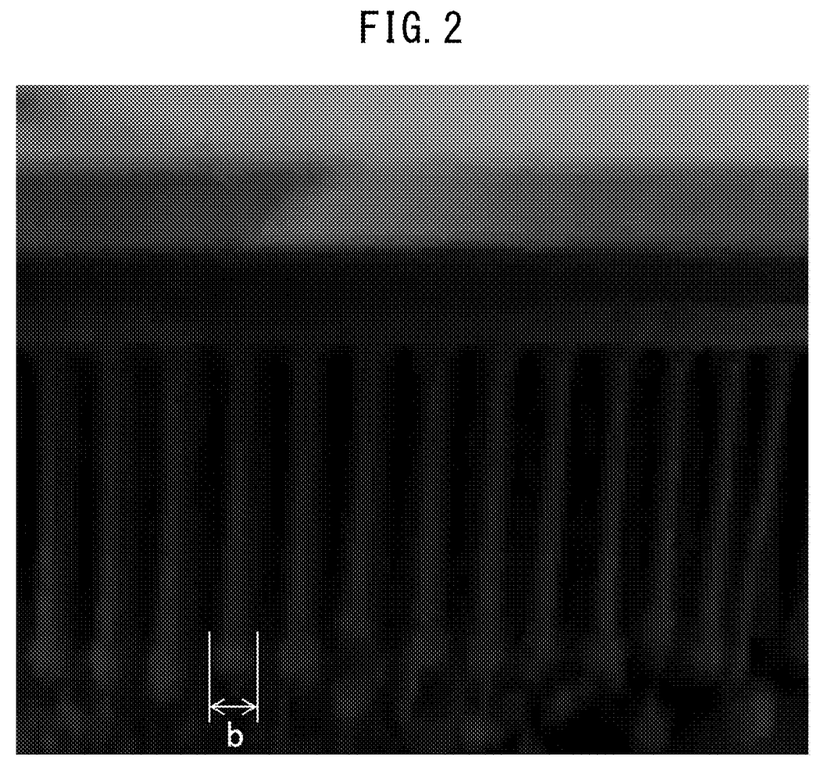
FIG. 2 is a photograph of liquid drops formed when starting supply of the slurry, taken by a high-speed camera.

FIG. 2 is a photograph taken with a high-speed camera, of which is the liquid drops formed when starting supply of the slurry from the shower nozzle used in Examples. The hole diameter of the discharge openings of the shower nozzle is 1.0 mm, and the diameter b) of the liquid drops is about 3.4 mm.

Figure 3:
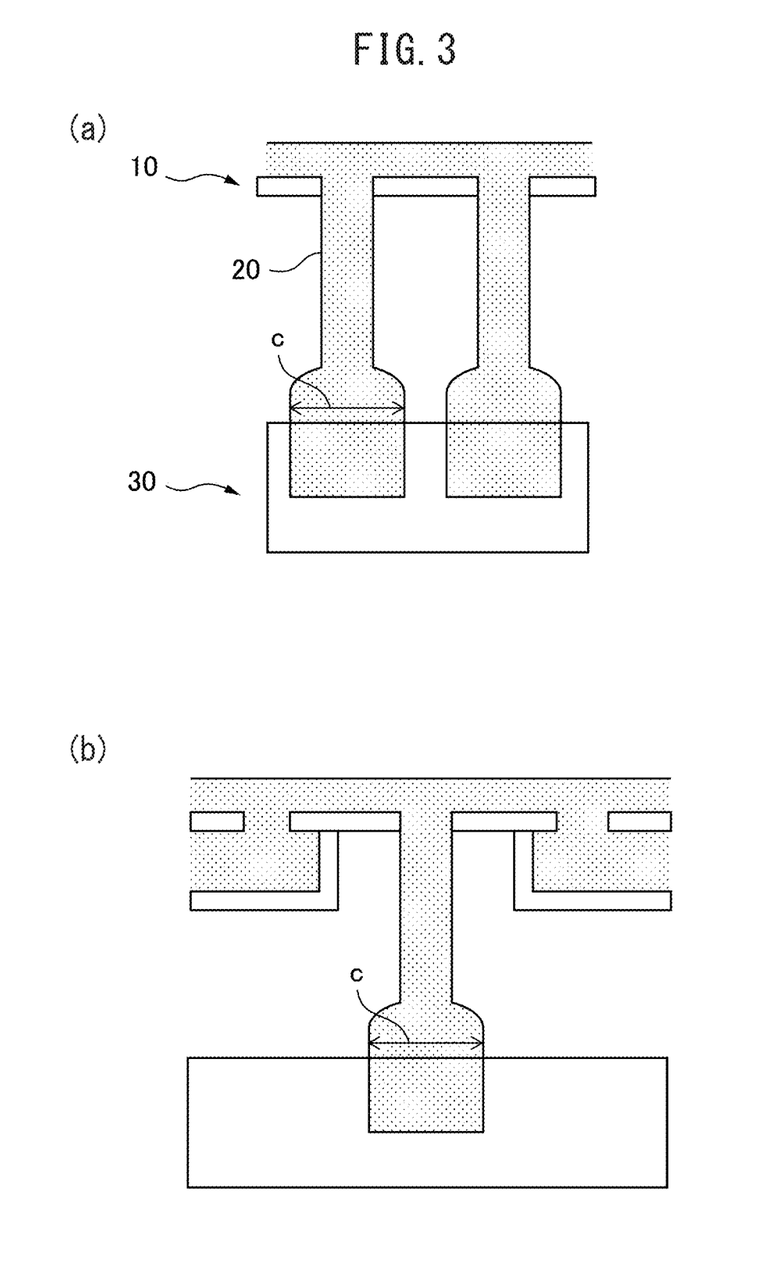
FIG. 3 shows an equivalent diameter c) of the slurry formed when supply of the slurry is started and the slurry spreads onto the honeycomb substrate.

The equivalent diameter c) represents the extent of the slurry face when the slurry spreads onto the honeycomb substrate, as shown in FIG. 3 (a). As shown in FIG. 3 (b), the equivalent diameter c) is measured by introducing the slurry to the honeycomb substrate from only one hole portion of the shower nozzle and photographing the slurry spread on the substrate with a high speed camera. In this case, it is intended that the slurry is not introduced to the substrate from other holes of the shower nozzle.

<Ratio a/b>

In the method of the present invention, a discharge opening of the shower nozzle is positioned with the spacing a) from the nearest discharge opening. By doing so, convergence of the slurry discharged from the discharge openings can be prevented. On the other hand, when the spacing a) is too large, an uncoated portion of the slurry is formed on the upper portion of the honeycomb substrate. Therefore, the spacing a) needs to be small to some extent. The degree of smallness of the spacing a) can be determined in relation to the diameter b) of the liquid drops formed when starting supply of the slurry.

According to the study by the present inventors, it was found that, when the spacing a) and the diameter b) have a relationship of 0.85<a/b, the convergence of the slurry can be substantially prevented, and the uncoated portion of the slurry is reduced. The ratio a/b may be 0.88 or more, 0.90 or more, 0.92 or more, 0.95 or more, 0.98 or more, 1.00 or more, 1.02 or more, or 1.05 or more, and it may be 1.50 or less, less than 1.50, 1.40 or less, 1.35 or less, 1.30 or less, 1.25 or less, 1.20 or less, or 1.15 or less.

In particular, when the viscosity of the slurry at a shear rate of 4 $s^{-1}$ is 10 mPa·s or more and 300 mPa·s or less, the ratio a/b may be more than 0.95 and less than 1.25, preferably 0.98 or more and 1.20 or less. In addition, when the viscosity of the slurry at a shear rate of 4 $s^{-1}$ is more than 300 mPa·s and 800 mPa·s or less, the ratio a/b may be more than 0.85 and less than 1.50, preferably 0.90 or more and 1.35 or less.

An appropriate range of the spacing a) depends on the diameter b) of the liquid drops formed when starting supply of the slurry and on the viscosity of the slurry, but it may be 2.6 mm or more, 2.8 mm or more, 3.0 mm or more, 3.2 mm or more, 3.4 mm or more, or 3.6 mm or more, and 5.5 mm or less, 5.0 mm or less, 4.8 mm or less, 4.5 mm or less, 4.3 mm or less, or 4.1 mm or less.

The spacings a) between adjacent discharge openings may be all substantially uniform in the surface of the shower nozzle where the discharge openings are present. However, within a range that does not significantly impair the advantageous effects of the present invention, the spacings a) does not need to be all uniform, and the discharge openings may be adjacent to each other at spacings narrower or wider than the spacing a). For example, 50% or more, 60% or more, 70% or more, 80% or more, 90% or more, 95% or more, and 98% or more of the total number of spacings between adjacent discharge openings may have the above-mentioned spacing a). When the discharge openings are adjacent to each other at a spacing narrower or wider than the spacing a), such a spacing a') may be in the range of 80% to 120%, in the range of 90 to 110%, or 95 to 105% of the length of the spacing a).

In the case where the slurry is discharged from each of the discharge openings with the same degree of pressure, the spacing a) is preferably substantially uniform in the surface of the shower nozzle, but as will be explained below, it may be preferable to finely adjust each of the spacing a) between the discharge openings in the surface of the shower nozzle.

Figure 7:
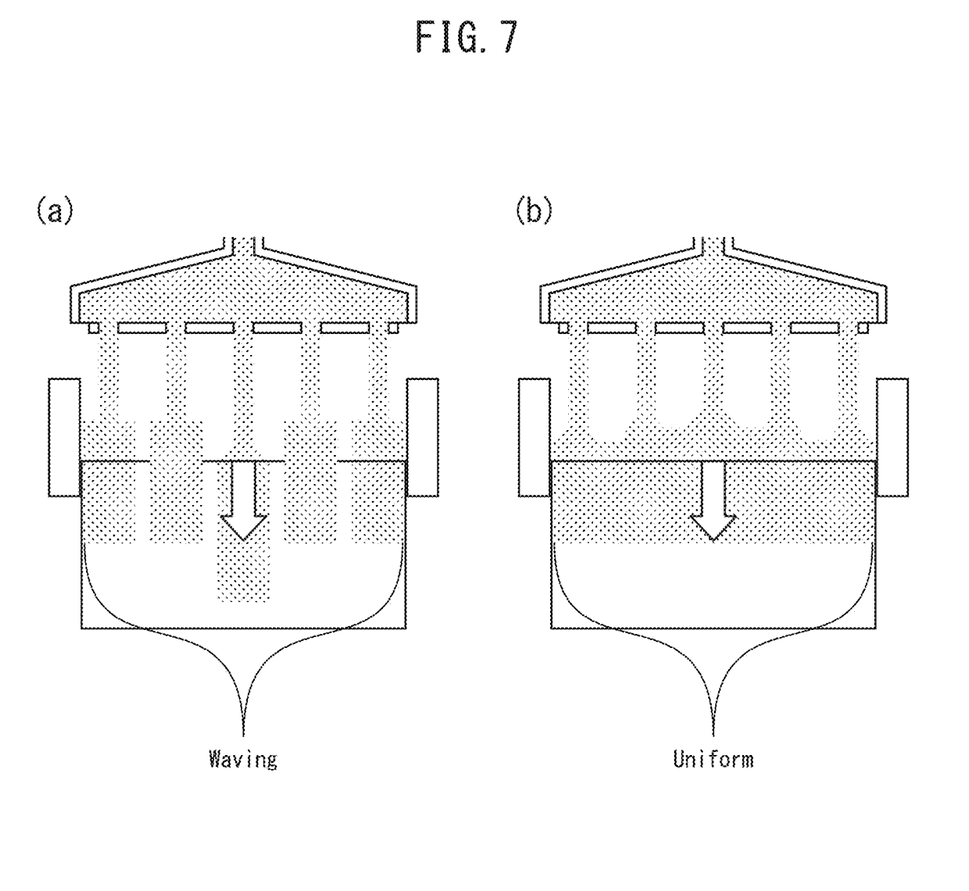

In this regard, the present inventors have found that, in the case where the honeycomb substrate is coated using a low viscosity slurry, only with slight unevenness in the slurry provision on the upper portion of the honeycomb substrate, the honeycomb substrate cannot be uniformly coated and the waving phenomenon of slurry is likely to occur. The waving phenomenon is a phenomenon in which a portion (in this case, the central portion) of the honeycomb substrate is unevenly coated with the slurry as shown in FIG. 7A. Although a large variation does not occur in the coating thickness by the slurry, a variation in the length of which each of cells of the substrate is coated occurs. This phenomenon is believed to occur because of the following reasons. When a low viscosity slurry is provided on the upper portion of the honeycomb substrate, the slurry flows down into the honeycomb substrate, and the slurry is provided without being evenly distributed on the upper portion of the honeycomb substrate. Such a waving phenomenon hardly occurred when the slurry had a high viscosity. This is because, as shown in FIG. 7 (b), when the slurry has a high viscosity, the slurry is once stored in the upper portion of the honeycomb substrate, and the level of the liquid surface of the slurry is flattened to a certain extent.

Furthermore, the present inventors have found that, when the same discharge openings are provided uniformly in the surface of the shower nozzle, a relatively large amount of slurry is provided at the central portion of the nozzle and a relatively small amount of slurry is provided at the outer peripheral portion thereof, and thus waving is likely to occur. Therefore, the present inventors have found that the slurry can be uniformly provided over the entire surface of the upper portion of the honeycomb substrate by decreasing the spacing between the discharge openings at the outer peripheral portion of the shower nozzle, thereby preventing the waving.

In order not to cause waving, the spacing a) between the discharge openings can be made larger at the central portion of the shower nozzle than at the outer peripheral portion thereof. For example, within the range in which the advantageous effects of the present invention can be obtained, assuming that the average value of the spacing a) at the central portion is 1, the average value of the spacing at the outer peripheral portion may be 0.25 or more, 0.3 or more, 0.4 or more, 0.5 or more, 0.6 or more, 0.7 or more, or 0.8 or more, and may be less than 1.0, 0.95 or less, 0.90 or less, 0.85 or less, 0.80 or less, or 0.75 or less. In addition, the spacing a) between the discharge openings can be gradually reduced from the center of the shower nozzle to the edge of the shower nozzle.

Here, when an area where discharge openings exist in the surface of the shower nozzle is referred to as a "discharge opening existing area," the encircled area by a circle having a diameter of ½, ⅓ or ¼ of the equivalent diameter of the discharge opening existing area, whose center is the same as the center of the discharge opening existing area is referred to as a "central portion." Then, an area excluding the central portion of the discharge opening existing area can be referred to as an "outer peripheral portion." Incidentally, the equivalent diameter refers to a diameter of a perfect circle having an outer peripheral length equal to the outer peripheral length of the surface. In particular, when the shower nozzle has a substantially circular shape, the encircled area by a perfect circle having a diameter of ½, ⅓ or ¼ of the equivalent diameter of the circle of the shower nozzle, whose center is the same as the center of the circle of the shower nozzle is referred to as a "central portion" and the area excluding the central portion can be referred to as an "outer peripheral portion."

In particular, when the viscosity of the slurry at a shear rate of 4 $s^{-1}$ is 10 mPa·s or more and 300 mPa·s or less, the spacing a) can be set to 3.2 mm or more and 4.3 mm or less. In addition, when the viscosity of the slurry at a shear rate of 4 $s^{-1}$ is more than 300 mPa·s and 800 mPa·s or less, the spacing a) can be set to 2.6 mm or more and 5.5 mm or less.

The diameter b) of the liquid drops formed when starting supply of the slurry is influenced by the hole diameter and shape of the discharge opening, the discharge pressure, the viscosity of the slurry, and the like. The diameter b) of the liquid drops can be measured from an image taken by a speed camera when starting supply of the slurry, and can be determined from an average diameter of a plurality of liquid drops.

The hole diameter of the discharge opening is not particularly limited, but it is preferable that the hole diameter is small so that the slurry does not drip from the discharge opening of the shower nozzle even when it is not intended to provide the slurry. It was found that dripping occurs notably when the viscosity of the slurry at a shear rate of 4 $s^{-1}$ is 10 mPa·s or more and 300 mPa·s or less.

The shape of the hole of the discharge opening is not particularly limited. For example, the hole diameter, as expressed by equivalent diameter, is preferably less than 2.0 mm, and may be 0.30 mm or more, 0.50 mm or more, 0.70 mm or more, or 0.90 mm or more, and 1.80 mm or less, 1.50 mm or less, 1.30 mm or less, or 1.10 mm or less. Further, the hole diameter and shape of the discharge opening do not have to be the same for all the holes, and may vary as long as the effects of the present invention can be obtained.

Figure 8:
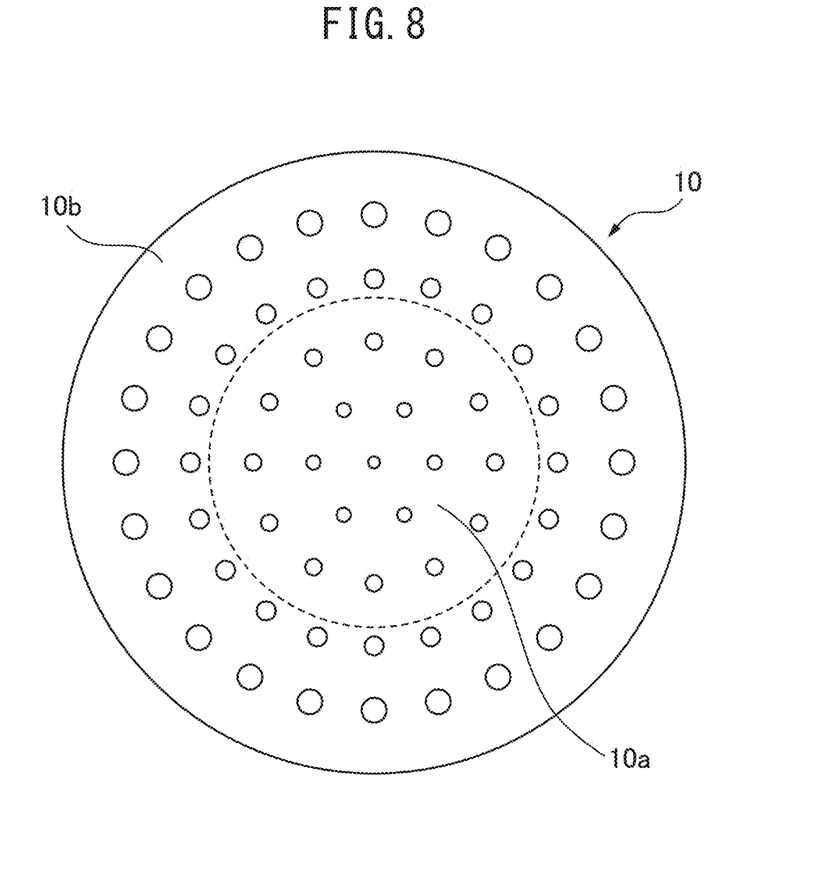
FIG. 8 shows a schematic view of an example of a shower nozzle in which the hole diameter of the discharge opening in the central portion is smaller than the hole diameter of the discharge opening in the outer peripheral portion.

Assuming that the hole diameter of the discharge openings is within the range where the advantageous effects of the present invention can be obtained so that no waving occurs, when the average value of the hole diameter of the discharge openings in the central portion is 1, the average value of the hole diameter of the discharge openings in the outer peripheral portion may be more than 1.0, 1.1 or more, 1.3 or more, 1.5 or more, 1.8 or more, or 2.0 or more, and may be 4.0 or less, 3.0 or less, 2.0 or less, or 1.5 or less. Further, as illustrated in FIG. 8, the hole diameter of the discharge openings can be gradually increased from the center of the shower nozzle to the edge of the shower nozzle.

The shower nozzle is preferably located immediately above the honeycomb substrate, and the discharge openings are preferably present at substantially equal spacings over the entire top surface of the honeycomb substrate located below the shower nozzle. In this case, the discharge openings may be arranged substantially equally in a lattice shape, or may be arranged substantially equally in a concentric circular shape. Further, for example, the discharge openings may be arranged substantially equally in various modes as described in Patent Document 2. However, as in one embodiment shown in FIG. 3, the shower nozzle used in the present invention tends to have a smaller discharge opening hole diameter and a smaller spacing a) than the shower nozzle disclosed in Patent Document 2.

Figure 4:
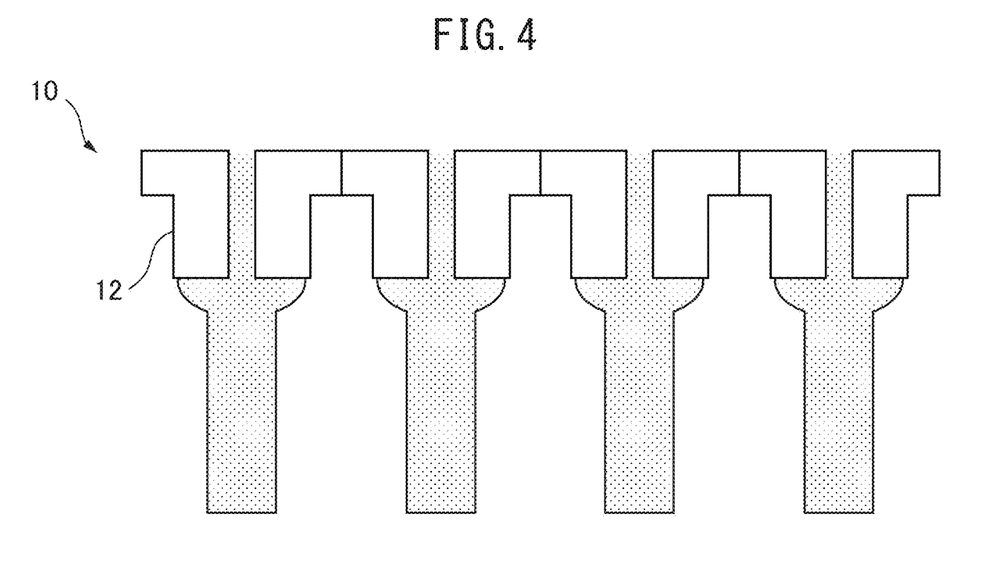
FIG. 4 shows one embodiment of a shower nozzle in which a discharge opening is present in a convex portion used in the manufacturing method of the present invention.
Figure 5:
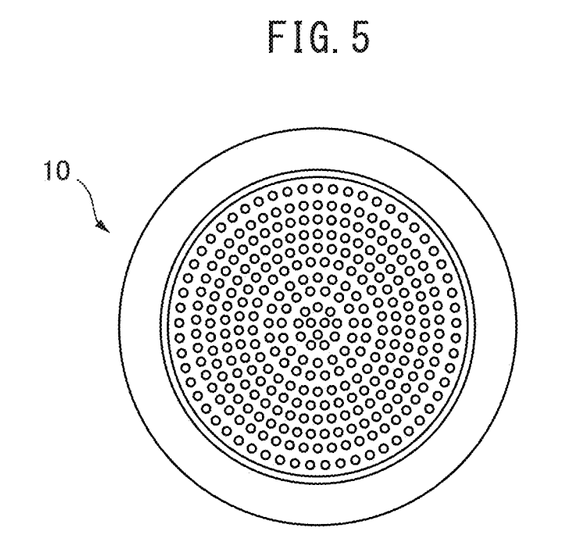
FIG. 5 shows one embodiment of a shower nozzle used in the manufacturing method of the present invention.

The discharge opening may be present at a convex portion of the surface of the shower nozzle. When the discharge opening exists in the convex portion, the slurry coming out of the discharge opening only spreads to the tip width of the convex portion, which is preferable, because the slurry does not tend to converge. For example, as shown in FIG. 3, a plurality of protrusions (12) may be present on the surface of the shower nozzle (10), and the discharge openings may be present at a substantially central portion of the protrusions. The equivalent diameter of this protrusion can also affect the diameter b) of the liquid drops. The shape of the protrusion is not limited to the trapezoidal shape as shown in FIG. 4, and is not particularly limited as long as the slurry can be prevented from being converged.

<Equivalent Diameter c) of the Slurry Face>

The larger the equivalent diameter c) of the slurry face when supply of the slurry is started and the slurry spreads on the honeycomb substrate, the smaller the uncoated portion on the upper portion of the honeycomb substrate, which is preferable. On the other hand, since the equivalent diameter c) is affected by the diameter b) of the liquid drops, an increase in the equivalent diameter is limited in order to prevent the convergence of the slurry. Also, the equivalent diameter c) is greatly affected by the viscosity of the slurry. If the viscosity of the slurry is high, the equivalent diameter c) can be increased, but if the viscosity of the slurry is high as described above, there is a problem that the slurry adheres to the manufacturing device, and there is a problem that the cost is increased due to a thickener. Therefore, there is also a limitation in increasing the equivalent diameter c) in this regard. Incidentally, the equivalent diameter refers to a diameter of a perfect circle having an outer peripheral length equal to the outer peripheral length of the surface.

The equivalent diameter c) is preferably greater than or equal to the spacing a) between the discharge openings. For example, the ratio c/a may be 1.00 or more, 1.10 or more, 1.15 or more, 1.20 or more, 1.30 or more, or 1.40 or more, and may be 3.0 or less, 2.5 or less, or 2.0 or less, or 1.5 or less. Specifically, the equivalent diameter c) may be 3.0 mm or more, 3.5 mm or more, 4.0 mm or more, or 4.5 mm or more, and may be 6.0 mm or less, 5.5 mm or less, 5.0 mm or less, or 4.5 mm or less.

<Rectification Plate>

Figure 9:
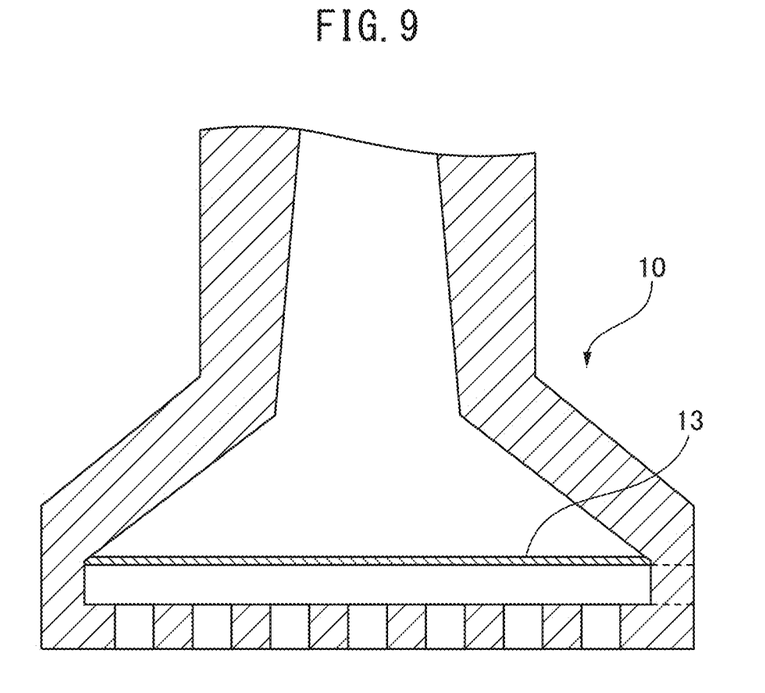
FIG. 9 shows a schematic view of an example of a shower nozzle having a rectification plate.

A rectification plate as shown in FIG. 9 can be provided inside the shower nozzle so as not to cause waving. The form of the rectification plate is not limited as long as it is for uniformly providing the slurry over the entire surface of the upper portion of the honeycomb substrate. For example, the rectification plate may be a plate having a hole similar to the discharge surface of the shower nozzle described above, or may be a deflector described in Patent Document 2.

Therefore, the rectification plate may be a plate having a plurality of holes, having a spacing a) in the above-mentioned range and having a pore diameter in the above-mentioned range.

<Slurry>

The slurry used in the method of the present invention is not particularly limited as long as it has a viscosity at a shear rate of 4 $s^{-1}$ of 800 mPa·s or less and is a slurry for catalyst layer formation of an exhaust gas purification device. The catalyst layer may be a catalyst layer for a three-way catalyst device for a gasoline engine, or may be a known catalyst layer for a purification device for a diesel engine or a lean burn engine, which can be a catalyst layer known in the art. Such a slurry is an aqueous dispersion in which an inorganic oxide or inorganic complex oxide support such as alumina, zirconia, ceria, and catalyst metal particles supported thereon are dispersed.

The viscosity of the slurry is lower than that of the slurry used in the prior art, and the viscosity at a shear rate of 4 s$^{-1}$ is 800 mPa·s or less, for example, the viscosity at a shear rate of 4 s$^{-1}$ may be 10 mPa·s or more, 20 mPa·s or more, 50 mPa·s or more, 100 mPa·s or more, or 200 mPa·s or more, and may be 700 mPa·s or less, 600 mPa·s or less, 500 mPa·s or less, 400 mPa·s or less, 300 mPa·s or less, 250 mPa·s or less, or 200 mPa·s or less. Here, the viscosity is measured using an E-type viscometer (TVE-35H, manufactured by Toki Sangyo Co., Ltd.) using a rotor type: 1° 34'×R24 at a measurement temperature of 25° C.

The slurry may contain a thickener at 1.0 wt % or less, 0.5 wt % or less, 0.3 wt % or less, or 0.1 wt % or less to adjust the viscosity. However, preferably no thickener is contained. The thickener can include a water-soluble organic polymer.

<Honeycomb Substrate>

The honeycomb substrate used in the method of the present invention is not particularly limited as long as it is a honeycomb substrate for an exhaust gas purification device known in the art. Specifically, as the honeycomb substrate, a honeycomb substrate having a large number of cells can be used, and for example, a ceramic material having heat resistance such as cordierite ($2MgO \cdot 2Al_2O_3 \cdot 5SiO_2$), alumina, zirconia, silicon carbide, etc., or a metal material made of metal foil such as stainless steel can be used.

The honeycomb substrate may be a wall flow type honeycomb substrate or a straight flow type honeycomb substrate. In addition, in the honeycomb substrate, the opening diameter of the cells on the front side (engine side) may be different from the opening diameter of the cells on the rear side. An exhaust gas purification device obtained using a wall flow type honeycomb substrate in the method of the present invention is particularly advantageous because its pressure loss becomes particularly low.

The number of cells of the honeycomb substrate may be, for example, 300 cells/in$^2$ or more, 500 cells/in$^2$ or more, 800 cells/in$^2$ or more, 1000 cells/in$^2$ or more, or 1200 cells/in$^2$ or more, and may be 2000 cells/in$^2$ or less, 1500 cells/in$^2$ or less, 1200 cells/in$^2$ or less, 1000 cells/in$^2$ or less, or 800 cells/in$^2$ or less. The number of cells of the honeycomb substrate may affect the equivalent diameter c) of the slurry face when supply of the slurry is started and the slurry spreads on the honeycomb substrate. Depending on the number of cells of the honeycomb substrate, various conditions may be adjusted.

<Slurry Provision Step>

The step of providing the slurry is carried out according to the features of the present invention as described above, but for the part not related to the features of the present invention, this step can be carried out in the same manner as the prior art. For example, Patent Document 2 can be referred to for the part not related to the features of the method of the present invention.

In the step of providing the slurry, a guide can be used to prevent slurry leakage from the upper portion of the honeycomb substrate and the slurry from flowing down the outer surface of the honeycomb substrate. Although such a guide is also disclosed in Patent Document 2, Patent Document 2 aims to make the liquid level of the slurry provided on the upper portion of the substrate uniform, so the purpose of the disclosed guide is different from the guide used in the present invention, and its structure may be different accordingly.

<Slurry Coating Step>

In the step of coating the honeycomb substrate with the slurry provided on the upper portion of the honeycomb substrate, as described in Patent Documents 1 and 2, suction can be performed from the lower portion side of the honeycomb substrate to promote the falling of the slurry. However, in the method of the present invention, since the slurry has a low viscosity, suction does not have to be performed.

<Firing Step>

The firing conditions of the slurry-coated substrate are not particularly limited, but for example, firing is carried out at about 400 to 1000° C. for about 1 to 4 hours. Thereby, the target catalyst layer can be formed. Drying may be performed before firing, and the conditions therefor are not particularly limited. For example, drying can be performed at a temperature of 80 to 300° C. for about 1 to 12 hours.

The present invention will be more specifically described by the following examples, but the present invention is not limited thereby.

EXAMPLES

Experiment 1. Evaluation of the Slurry Loss when Using the Slurry Having Different Viscosities Slurries having different viscosities as described in Table 1 were prepared. In reference examples 1 to 3 in which no thickener was used, the viscosity was adjusted by the solid weight.

A wall flow type honeycomb substrate having a diameter of 160 mm and a height of 180 mm was placed in a device as shown in FIG. 6, and a guide was attached to the substrate. 800 ml of each slurry described in Table 1 was provided on the upper portion of the honeycomb substrate using a shower nozzle having a discharge opening hole diameter of 1 mm and a spacing a) between discharge openings of 5.7 mm. Thereafter, suction was performed for 1 second from the duct. The wind speed on the honeycomb substrate at this time was 15 m/s.

After suction, the guide was removed, the weight of the guide with the slurry adhered was measured, and the slurry loss when using the slurry with each viscosity was calculated according to the following formula:

Slurry loss[%]=(weight of guide on which slurry is adhered-initial weight of guide) [g]/total slurry weight provided [g]×100%

In addition, the diameter b) of the slurry liquid drops, the equivalent diameter c) of the slurry in which the slurry spreads on the honeycomb substrate, and the ratio of the uncoated portion on the upper portion of the honeycomb substrate were evaluated.

Furthermore, the waving phenomenon of the slurry at the time of coating the honeycomb substrate was observed. In the waving evaluation, the coated honeycomb substrate was cut in the axial direction, and the value obtained by dividing the difference between the maximum coating length and the minimum coating length of the coating portion by the length of the honeycomb substrate was used for evaluation.

The results are shown in Table 1.

TABLE 1

| No. | viscosity (4 s$^{-1}$) [mPa · s] | amount of thickener [wt %] | slurry loss [%] | spacing a) between discharge openings [mm] | diameter b) of liquid drops [mm] | Equivalent diameter c) [mm] | Uncoated ratio [%] | waving [%] |
| --- | --- | --- | --- | --- | --- | --- | --- | --- |
| Ref Ex. 1 | 20 | 0 | 0.2 | 5.7 | 3.4 | 4.1 | 43 | 100 |
| Ref Ex. 2 | 250 | 0 | 0.3 | 5.7 | 3.4 | 4.5 | 20 | 100 |
| Ref Ex. 3 | 750 | 0 | 0.35 | 5.7 | 3.5 | 5.5 | 3 | 100 |
| Ref Ex. 4 | 1000 | 1 | 1.30 | 5.7 | 3.5 | 7 | 0 | 40 |
| Ref Ex. 5 | 1500 | 2 | 2.10 | 5.7 | 3.6 | 7.5 | 0 | 10 |

From this result, it was found that the slurry loss becomes sufficiently low when the viscosity is approximately 750 mPa·s or less.

Experiment 2. Evaluation of Presence/Absence of the Uncoated Portion by the Spacing a) Between Discharge Parts, the Diameter b) of the Slurry Liquid Drops, and the Equivalent Diameter c) of the Slurry in which the Slurry Spreads on the Honeycomb Substrate The shower nozzle was changed to the various shower nozzles described in Table 2 to evaluate the ratio of the uncoated portion of the upper portion of the honeycomb substrate and the waving of the slurry as performed in Experiment 1. Slurry loss was also evaluated.

The results are shown in Table 2.

From this result, when the viscosity is high, the slurry spreads over a wide range on the honeycomb substrate and the equivalent diameter c) becomes large. As a result, it is possible to eliminate the uncoated portion with a wide range of a/b. Also, it was found that, when the viscosity is high, the slurry does not tend to converge.

Experiment 3. Evaluation of Pressure Loss of the Obtained Exhaust Gas Purification Device Wall flow type honeycomb substrates coated with the slurries obtained in Reference Example 5 of Experiment 1 and Example 4 of Experiment 2 were dried and fired to produce exhaust gas purification devices. Further, the slurries were coated in the same manner as in Reference Example 5 of Experiment 1 and Example 4 of Experiment 2 except that straight flow type honeycomb substrates were

TABLE 2

| No. | viscosity (4 s$^{-1}$) [mPa · s] | spacing a) between discharge openings [mm] | diameter b) of liquid drops [mm] | equivalent diameter c) [mm] | a/b | c ≥ a | uncoated ratio [%] | slurry loss [%] | waving [%] |
| --- | --- | --- | --- | --- | --- | --- | --- | --- | --- |
| Example 1 | 20 | 2.75 | 3.4(convergence) | 4.1 | 0.81 | Yes | 50 | 0.17 | 100 |
| Example 2 | 20 | 3.25 | 3.4 | 4.1 | 0.96 | Yes | 5 | 0.15 | 100 |
| Example 3 | 20 | 3.50 | 3.4 | 4.1 | 1.03 | Yes | 0 | 0.15 | 70 |
| Example 4 | 20 | 3.70 | 3.4 | 4.1 | 1.09 | Yes | 0 | 0.16 | 60 |
| Example 5 | 20 | 4.00 | 3.4 | 4.1 | 1.18 | Yes | 0 | 0.15 | 65 |
| Example 6 | 20 | 4.25 | 3.4 | 4.1 | 1.25 | No | 6 | 0.14 | 100 |
| Example 7 | 20 | 4.50 | 3.4 | 4.1 | 1.32 | No | 16 | 0.15 | 100 |
| Example 8 | 20 | 5.00 | 3.4 | 4.1 | 1.47 | No | 35 | 0.15 | 100 |
| Example 9 | 20 | 6.00 | 3.4 | 4.1 | 1.76 | No | 58 | 0.15 | 100 |
| Example 10 | 750 | 2.50 | 3.5(convergence) | 5.5 | 0.71 | Yes | 20 | 0.34 | 100 |
| Example 11 | 750 | 3.00 | 3.5 | 5.5 | 0.86 | Yes | 0 | 0.35 | 50 |
| Example 12 | 750 | 3.50 | 3.5 | 5.5 | 1.00 | Yes | 0 | 0.34 | 40 |
| Example 13 | 750 | 4.00 | 3.5 | 5.5 | 1.14 | Yes | 0 | 0.34 | 35 |
| Example 14 | 750 | 4.50 | 3.5 | 5.5 | 1.29 | Yes | 0 | 0.35 | 45 |
| Example 15 | 1000 | 2.50 | 3.5 | 7.0 | 0.71 | Yes | 0 | 1.4 | 20 |
| Example 16 | 1000 | 3.00 | 3.5 | 7.0 | 0.86 | Yes | 0 | 1.3 | 25 |
| Example 17 | 1000 | 3.50 | 3.5 | 7.0 | 1.00 | Yes | 0 | 1.3 | 27 |
| Example 18 | 1000 | 4.00 | 3.5 | 7.0 | 1.14 | Yes | 0 | 1.3 | 25 |
| Example 19 | 1000 | 4.50 | 3.5 | 7.0 | 1.29 | Yes | 0 | 1.4 | 30 | used to produce exhaust gas purification devices of Reference Example 6 and Example 20.

The pressure loss of these exhaust gas purification devices was measured, compared with the pressure loss of the honeycomb substrate alone, and the rate of increase in pressure loss was calculated. Also, as in Experiment 1, the ratio of the uncoated portion of the upper portion of the honeycomb substrate and the waving of the slurry were evaluated.

The results are shown in Table 3.

TABLE 3

| No. | substrate | viscosity ($4s^{-1}$) [mPa·s] | uncoated ratio [%] | waving [%] | rate of increase in pressure loss [%] |
|---|---|---|---|---|---|
| Ref. Ex. 5 | wall flow | 1500 | 0 | 10 | 300 |
| Example 4 | wall flow | 20 | 0 | 100 | 140 |
| Ref. Ex. 6 | straight flow | 1500 | 0 | 20 | 137 |
| Example 20 | straight flow | 20 | 0 | 80 | 127 |

From this result, it was found that, in the case of the wall flow type honeycomb substrate, the increase in pressure loss can be significantly reduced by using a low viscosity slurry. In the case of the straight flow type honeycomb substrate, although the increase rate in pressure loss was originally low even if the high viscosity slurry was used, the increase rate of pressure loss was further decreased when the low viscosity slurry was used.

Experiment 4. Evaluation when the Hole Diameter of the Discharge Opening is Changed Between the Central Portion and the Outer Peripheral Portion of the Shower Nozzle Using a shower nozzle in which the hole diameter of the discharge part was changed between the central portion (inner side) and the outer peripheral portion (outer side) in the surface, the waving phenomenon of the slurry when coating the honeycomb substrate was observed. Here, the central portion is within a range of a circle having a diameter of 21 mm concentric with the central portion, and the outer peripheral portion is a region excluding the central portion in the circular plane. In addition, the discharge openings of the shower nozzle were evenly present at a discharge opening spacing a) of 3.7 mm in a circular plane of 152 mm in diameter.

In this experiment, a slurry having a viscosity of about 20 mPa·s was used. The equivalent diameter c) of the slurry face when supply of the slurry was started and the slurry spread on the honeycomb substrate was 4.1 mm. The ratio of the uncoated portion of the upper portion of the honeycomb substrate was approximately 0% in all cases, and the slurry loss was about 0.2% in all cases.

The results are shown in Table 4.

TABLE 4

| No. | central portion hole diameter | outer peripheral portion hole diameter | rectification plate | central portion liquid drop diameter b) [mm] | outer peripheral portion liquid drop diameter b) [mm] | central portion a/b | outer peripheral portion a/b | waving [%] |
|---|---|---|---|---|---|---|---|---|
| Example 21 | 0.6 | 1.2 | none | 2.5 | 3.4 | 1.48 | 1.09 | 10 |
| Example 22 | 0.6 | 1.4 | none | 2.5 | 3.5 | 1.48 | 1.06 | 5 |
| Example 23 | 0.6 | 1.6 | none | 2.5 | 3.55 | 1.48 | 1.04 | 20 |
| Example 24 | 0.6 | 1.8 | none | 2.5 | 3.8 | 1.48 | 0.97 | 60 |
| Example 25 | 0.8 | 1.2 | none | 2.9 | 3.4 | 1.28 | 1.09 | 20 |
| Example 26 | 0.8 | 1.4 | none | 2.9 | 3.5 | 1.28 | 1.06 | 15 |
| Example 27 | 0.8 | 1.6 | none | 2.9 | 3.55 | 1.28 | 1.04 | 5 |
| Example 28 | 0.8 | 1.8 | none | 2.9 | 3.8 | 1.28 | 0.97 | 25 |
| Example 29 | 1.0 | 1.2 | none | 3.2 | 3.4 | 1.16 | 1.09 | 30 |
| Example 30 | 1.0 | 1.4 | none | 3.2 | 3.5 | 1.16 | 1.06 | 20 |
| Example 31 | 1.0 | 1.6 | none | 3.2 | 3.55 | 1.16 | 1.04 | 15 |
| Example 32 | 1.0 | 1.8 | none | 3.2 | 3.8 | 1.16 | 0.97 | 10 |
| Example 33 | 1.2 | 1.2 | none | 3.4 | 3.4 | 1.09 | 1.09 | 35 |
| Example 34 | 1.2 | 1.4 | none | 3.4 | 3.5 | 1.09 | 1.06 | 32 |
| Example 35 | 1.2 | 1.6 | none | 3.4 | 3.55 | 1.09 | 1.04 | 28 |
| Example 36 | 1.2 | 1.8 | none | 3.4 | 3.8 | 1.09 | 0.97 | 20 |

Comparing Examples 21 to 36 with Examples 1 to 9 in Table 2, it can be seen that by setting the a/b at the central portion of the nozzle to be larger than the a/b at the outer peripheral portion of the nozzle, waving is substantially suppressed. However, it was suggested that waving may occur if the difference between the a/b at the central portion of the nozzle and the a/b at the outer peripheral portion of the nozzle is too large.

Experiment 5. Evaluation in the Case of Providing a Rectification Plate Inside the Shower Nozzle A rectification plate was placed inside the shower nozzle used in Experiment 4, and the observation was made with respect to waving phenomenon of the slurry when coating the honeycomb substrate. The rectification plate was provided with holes having the diameters shown in Table 5 below, and in the shower nozzle, holes having a hole diameter of 1.2 mm were evenly present at a spacing of 3.7 mm. Incidentally, the central portion and the outer peripheral portion are as described in Experiment 4 above.

In this experiment, a slurry having a viscosity of about 20 mPa·s was used. The equivalent diameter c) of the slurry face when supply of the slurry was started and the slurry spread on the honeycomb substrate was 4.1 mm. The ratio of the uncoated portion of the upper portion of the honeycomb substrate was approximately 0% in all cases, and the slurry loss was about 0.2% in all cases.

The results are shown in Table 5.

TABLE 5

| No. | nozzle hole diameter | rectification plate present/absent | central portion hole diameter | outer peripheral portion hole diameter | central liquid drop diameter b) [mm] | outer peripheral portion liquid drop diameter b) [mm] | central portion a/b | outer peripheral portion a/b | waving [%] |
|---|---|---|---|---|---|---|---|---|---|
| Example 37 | 1.2 | present | 0.6 | 1.2 | 3.4 | 3.4 | 1.09 | 1.09 | 1 |
| Example 38 | 1.2 | present | 0.6 | 1.4 | 3.4 | 3.4 | 1.09 | 1.09 | 2 |
| Example 39 | 1.2 | present | 0.6 | 1.6 | 3.4 | 3.4 | 1.09 | 1.09 | 10 |
| Example 40 | 1.2 | present | 0.6 | 1.8 | 3.4 | 3.4 | 1.09 | 1.09 | 20 |
| Example 41 | 1.2 | present | 0.8 | 1.2 | 3.4 | 3.4 | 1.09 | 1.09 | 13 |
| Example 42 | 1.2 | present | 0.8 | 1.4 | 3.4 | 3.4 | 1.09 | 1.09 | 7 |
| Example 43 | 1.2 | present | 0.8 | 1.6 | 3.4 | 3.4 | 1.09 | 1.09 | 3 |
| Example 44 | 1.2 | present | 0.8 | 1.8 | 3.4 | 3.4 | 1.09 | 1.09 | 0 |
| Example 45 | 1.2 | present | 1.0 | 1.2 | 3.4 | 3.4 | 1.09 | 1.09 | 20 |
| Example 46 | 1.2 | present | 1.0 | 1.4 | 3.4 | 3.4 | 1.09 | 1.09 | 10 |
| Example 47 | 1.2 | present | 1.0 | 1.6 | 3.4 | 3.4 | 1.09 | 1.09 | 8 |
| Example 48 | 1.2 | present | 1.0 | 1.8 | 3.4 | 3.4 | 1.09 | 1.09 | 6 |
| Example 49 | 1.2 | present | 1.2 | 1.2 | 3.4 | 3.4 | 1.09 | 1.09 | 25 |
| Example 50 | 1.2 | present | 1.2 | 1.4 | 3.4 | 3.4 | 1.09 | 1.09 | 20 |
| Example 51 | 1.2 | present | 1.2 | 1.6 | 3.4 | 3.4 | 1.09 | 1.09 | 18 |
| Example 52 | 1.2 | present | 1.2 | 1.8 | 3.4 | 3.4 | 1.09 | 1.09 | 10 |

By comparing Examples 37 to 52 with Example 33 in Table 4, it can be seen that by disposing the rectification plate inside the shower nozzle, it is possible to largely suppress the waving phenomenon of the slurry when the honeycomb substrate is coated.

DESCRIPTION OF THE SYMBOLS 10 shower nozzle
10a central portion of shower nozzle
10b outer peripheral portion of shower nozzle
11 discharge opening
12 convex portion
13 rectification plate
20 slurry
21 liquid drop
30 honeycomb substrate
40 guide
50 support
60 duct

The invention claimed is:

1. A manufacturing method for an exhaust gas purification device, the method comprising:
   providing a slurry for catalyst layer formation from a nozzle onto an upper end portion of a honeycomb substrate;
   coating the honeycomb substrate with the slurry; and
   firing the slurry coated honeycomb substrate,
   wherein the viscosity of the slurry at a shear rate of 4 $s^{-1}$ is 800 mPa·s or less,
   wherein the nozzle has a plurality of discharge openings for discharging the slurry, and an average spacing a between adjacent discharge openings among the plurality of discharge openings and an average diameter b of liquid drops of the slurry formed when starting supply of the slurry have the following relationship:

$0.85 < a/b$, and wherein an average diameter c of a plurality of slurry faces formed by the liquid drops spreading onto the honeycomb substrate when supply of the slurry is started is greater than or equal to the average spacing a between the adjacent discharge openings.

2. The manufacturing method according to claim 1, wherein the viscosity of the slurry at a shear rate of 4 $s^{-1}$ is 10 mPa·s or more and 300 mPa·s or less, and the average spacing a between the adjacent discharge openings and the average diameter b of the liquid drops have a relationship of $0.95 < a/b < 1.25$.

3. The manufacturing method according to claim 1, wherein the viscosity of the slurry at a shear rate of 4 $s^{-1}$ is more than 300 mPa·s and 800 mPa·s or less, and the average spacing a between the adjacent discharge openings and the average diameter b of the liquid drops have a relationship of $0.90 \leq a/b \leq 1.35$.

4. The manufacturing method according to claim 1, wherein a hole diameter of each of the discharge openings is less than 2 mm.

5. The manufacturing method according to claim 1, wherein the discharge openings of the nozzle are present in a convex portion on a surface of the nozzle.

6. The manufacturing method according to claim 1, wherein the average spacing a between the adjacent discharge openings is 3.25 mm or more and 4.25 mm or less.

7. The manufacturing method according to claim 1, further comprising performing suction from a lower portion of the honeycomb substrate when the coating is performed.

8. The manufacturing method according to claim 1, comprising using a guide for preventing the slurry from leaking from the upper end portion of the honeycomb substrate when the slurry is provided from the nozzle.

9. The manufacturing method according to claim 1, wherein:

a surface of the nozzle includes a central portion and an outer peripheral portion, the central portion and the outer peripheral portion each include the discharge openings, and when an average spacing between the adjacent discharge openings in the central portion of the nozzle is 1, an average spacing between the adjacent discharge openings in the outer peripheral portion is 0.25 or more and less than 1.0.

10. The manufacturing method according to claim 9, wherein:

the central portion is a circular area having a diameter that is ½ of a diameter of a discharge opening area of the surface of the nozzle in which the discharge openings are formed, and the outer peripheral portion is an area disposed within the discharge opening area excluding the central portion.

11. The manufacturing method according to claim 1, wherein:

a surface of the nozzle includes a central portion and an outer peripheral portion, the central portion and the outer peripheral portion each include the discharge openings, and when an average hole diameter of the discharge openings in the central portion of the nozzle is 1, an average hole diameter of the discharge openings in the outer peripheral portion is more than 1.0 and 4.0 or less.

12. The manufacturing method according to claim 11, wherein:

the central portion is a circular area having a diameter that is ½ of a diameter of a discharge opening area of the surface of the nozzle in which the discharge openings are formed, and the outer peripheral portion is an area disposed within the discharge opening area excluding the central portion.

13. The manufacturing method according to claim 1, wherein a rectification plate for uniformly providing the slurry over an entire surface of the upper end portion of the honeycomb substrate is present inside the nozzle.

* * * * *